T. W. ANDERSON.
SANITARY MILK BOTTLE COVER.
APPLICATION FILED MAR. 10, 1921.
1,409,812.
Patented Mar. 14, 1922.
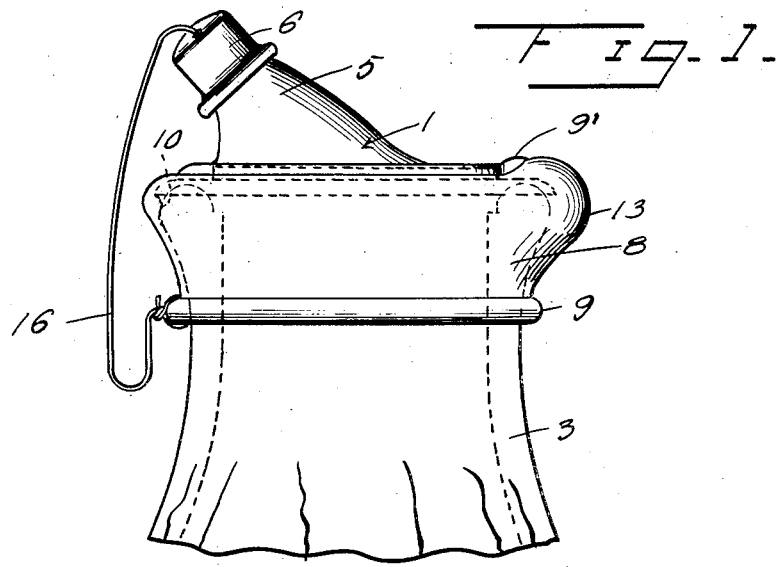
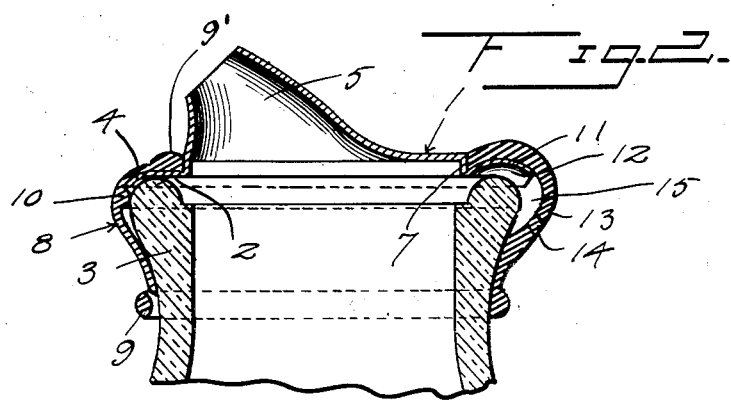
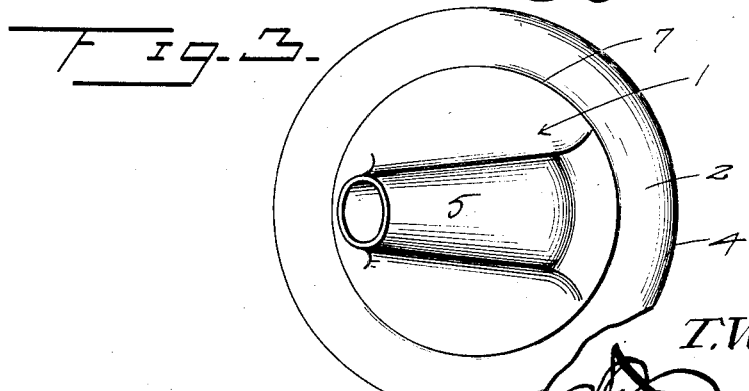
Inventor
T. W. Anderson
By _____ Attorney

UNITED STATES PATENT OFFICE.

THORE W. ANDERSON, OF ARLINGTON, MASSACHUSETTS.

SANITARY MILK-BOTTLE COVER.

1,409,812.

Specification of Letters Patent.   Patented Mar. 14, 1922.

Application filed March 10, 1921.  Serial No. 451,324.

*To all whom it may concern:*

Be it known that I, THORE W. ANDERSON, a citizen of the United States, residing at Arlington, in the county of Middlesex and State of Massachusetts, have invented certain new and useful Improvements in Sanitary Milk-Bottle Covers; and I do hereby declare the following to be a full, clear, and exact description of the invention, such as will enable others skilled in the art to which it appertains to make and use the same.

This invention relates to new and useful improvements in bottle covers especially adapted to maintain the contents of a bottle in a sanitary condition after the bottle has been opened and has for its primary object the provision of a cover provided with a pouring spout and a vent to permit the contents of the bottle to be easily and quickly dispensed when desired and said spout is equipped with a closure plug to prevent evaporation of the contents of the bottle and the entrance of foreign matter into said bottle during the period when the contents is being kept in said bottle.

Another object of this invention is the provision of an elastic cap for retaining the cover on the bottle and is provided with means which will permit air to reach the vent of said cover but obviate any chance of foreign matter entering the bottle by way of the vent.

A further object of this invention is the provision of a bottle cover of the above stated character, which will be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a side elevation illustrating a cover applied to a bottle and constructed in accordance with my invention, Figure 2 is a sectional view illustrating the same, Figure 3 is a top plan view illustrating the cover.

Referring in detail to the drawings, the numeral 1 indicates as an entirety a cover constructed from any material suitable for the purpose and consists of a disk 2 adapted to rest upon the upper edge of a bottle 3. The disk 2 is provided with a beveled edge 4 and is also offset to form a pouring spout 5 that inclines towards one side of the disk and also tapers towards its discharge end. The spout 5 is adapted to be closed by a removable plug or stopper 6 to prevent dirt and other foreign matter from entering the bottle by way of the spout 5. The formation of the spout 5 on the disk 2 forms a shoulder 7 adapted to be engaged by a retaining member 8 and the latter is preferably constructed from elastic material having each edge enlarged or thickened to form beads 9 and 9'. The beads 9 are adapted to engage the neck of the bottle to retain the retaining member 8 thereon while the bead 9' snugly engages the shoulder 7 upon the cover 1 with the side wall of the retaining member 8 overlying the disk 2. A bead 10 is formed on the inner face of the wall of the retaining member 8 and is adapted to engage the outer face of the neck of the bottle adjacent the mouth or open end of the neck for aiding and retaining the member 8 upon the bottle.

The disk 2 is offset as illustrated at 11 to form a vent passage 12 and the retaining element 8 has formed upon its side a thickened portion 13 which is provided with a vent opening 14 adjacent its lower portion to permit air to pass into the space 15 formed between the offset portion 13 and the neck of the bottle 3. The outer end of the vent passage 12 communicates with the space 15 so that the air may pass through the vent passage 12 into the bottle for aiding in discharging the contents or fluid of the bottle through the pouring spout 5.

The retaining element 8 is provided with an opening to receive a cord or other flexible element 16 which is in turn connected to the plug or stopper 6 to prevent the same from becoming lost when removed from the pouring spout.

From the foregoing description taken in connection with the accompanying drawings, it will be noted that a device has been provided which will effectively seal or close the bottle against entrance of foreign matter to the interior thereof and also provides a device which may be readily and quickly applied and removed from the bottle and further may be kept in a sanitary and clean condition owing to its construction.

The beads 9 upon the retaining member 8 besides forming a means for holding or bringing about a tight gripping action between the element 8 and the bottle prevent the edges of said element 8 from curling or becoming torn or injured during the removal or application of the element 8 to the bottle.

While I have shown and described the preferred embodiment of my invention, it will be understood that minor changes in construction, combination, and arrangement of parts may be made without departing from the spirit and scope of the invention as claimed.

Having thus described my invention what I claim is:

1. A bottle cover comprising a disk adapted to rest on the neck of a bottle for closing the latter, and an offset formed in one edge of the disk to space that portion of said disk away from the edge of the neck of the bottle to admit air to the bottle and to prevent the entrance of dirt into the bottle.

2. A bottle cover comprising a disk adapted to rest on the neck of a bottle and having an offset positioned from the neck of said bottle to admit air to the latter, means securing the disk to the bottle and spaced at one point away from the bottle and having an opening to admit air to the offset of the disk.

3. A bottle cover comprising a disk having a portion thereof offset to form a discharge spout and a shoulder, vent means carried by said disk and an elastic retaining member engaging said disk and shoulder and the neck of a bottle.

4. A bottle cover comprising a disk, a pouring spout formed on said disk and tapered towards the free end, said disk having a portion thereof offset to form a vent passage, an elastic member engaging said disk and the neck of the bottle, an enlarged and thickened portion formed on said elastic member, and disposed over the vent passage and having an opening.

5. A bottle cover comprising a disk, a discharge spout on said disk, said disk having an offset portion to form a passage, an elastic member engaging said disk and the neck of a bottle and having an enlarged and thickened portion disposed over said passage and spaced away from the neck of the bottle and having a vent opening, and a stopper for said discharge spout.

6. A bottle cover comprising a disk having a portion offset to form a discharge spout and a shoulder, an elastic member engaging over the disk and having its edges enlarged to form beads, one of said beads engaging the shoulder and the other bead engaging the neck of a bottle, said disk and elastic member having vent means, an internal bead formed on the elastic member and engaging the neck of the bottle.

In testimony whereof I affix my signature in presence of two witnesses.

THORE W. ANDERSON.

Witnesses:
IDA ANDERSON,
OHNORE C. FRANCIS.